United States Patent [19]

Motomura et al.

[11] 4,319,621
[45] Mar. 16, 1982

[54] PNEUMATIC RADIAL TIRE HAVING AN IMPROVED BEAD PORTION REINFORCING CONSTRUCTION

[75] Inventors: Kenichi Motomura, Higashi-Murayama; Shigeo Watanabe, Kokubunji; Toshiyuki Sogi, Higashi-Yamato, all of Japan

[73] Assignee: Bridgestone Tire Company Limited, Tokyo, Japan

[21] Appl. No.: 40,823

[22] Filed: May 21, 1979

Related U.S. Application Data

[63] Continuation of Ser. No. 808,947, Jun. 22, 1977, abandoned.

[30] Foreign Application Priority Data

Jun. 22, 1976 [JP] Japan .................... 51-72714

[51] Int. Cl.³ .............................................. B60C 15/06
[52] U.S. Cl. .................................. 152/362 CS; 152/359
[58] Field of Search ............ 152/354 R, 354 RB, 355, 152/356, 357–359, 362 R, 362 CS

[56] References Cited

U.S. PATENT DOCUMENTS

| | | | |
|---|---|---|---|
| 3,449,199 | 6/1969 | Mead | 152/210 |
| 3,682,222 | 8/1972 | Alderfer | 152/361 |
| 3,841,377 | 10/1974 | Montagne | 152/362 CS |
| 3,842,883 | 10/1974 | Masson et al. | 152/362 R |
| 3,964,533 | 6/1976 | Arimora et al. | 152/362 R |
| 4,046,183 | 9/1977 | Takahashi et al. | 152/354 R |
| 4,077,454 | 3/1978 | Miyoshi et al. | 152/354 R |

Primary Examiner—Edward C. Kimlin
Assistant Examiner—Lois E. Boland
Attorney, Agent, or Firm—Sughrue, Mion, Zinn, Macpeak and Seas

[57] ABSTRACT

A pneumatic radial tire having an improved bead portion reinforcing construction is disclosed. The radial tire comprises a bead portion reinforcing band disposed along the bead portion formed by folding the ply of the carcass body around the bead ring. The bead portion reinforcing band comprises at least one chipper layer. The chipper is composed of a reinforcing element embedded in rubber and formed of 1 to 50 helically formed filaments. The reinforcing element has a modulus of elasticity of $0.029 \times 10^4$ kg/mm² to $1.60 \times 10^4$ kg/mm² and is inclined at a given angle with respect to the ply cords of the carcass body so as to make the chipper as a whole extensible and rigid.

1 Claim, 27 Drawing Figures

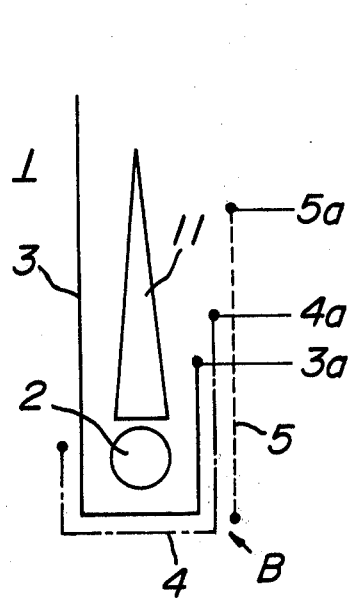
FIG_1a
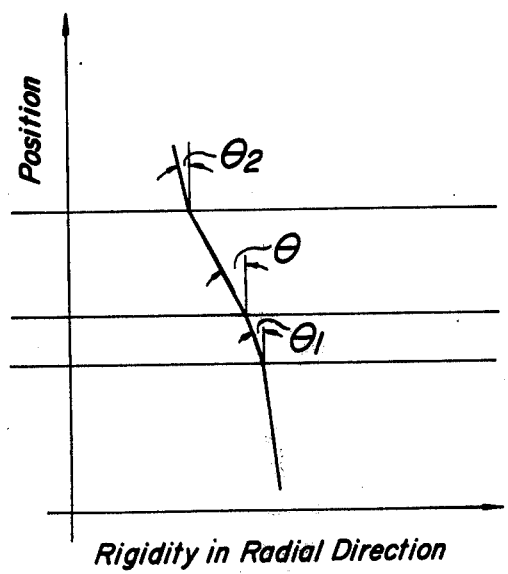
FIG_1b

FIG.3
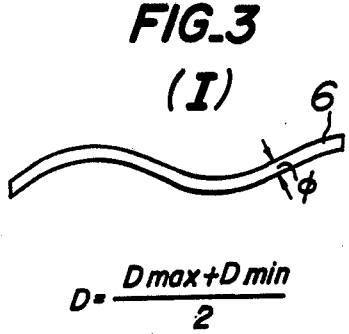
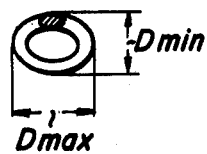
$$D = \frac{Dmax + Dmin}{2}$$
FIG.3a
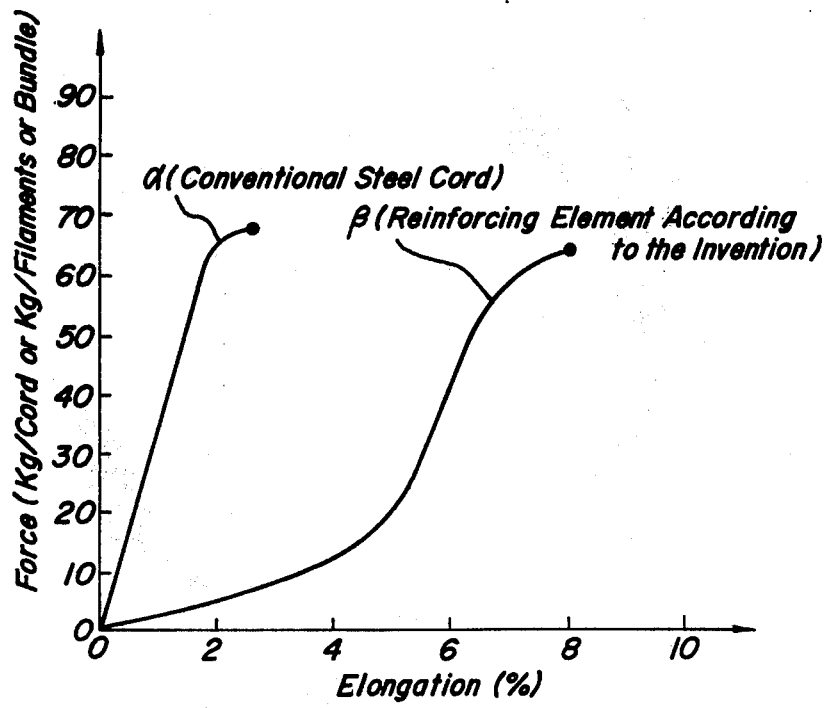

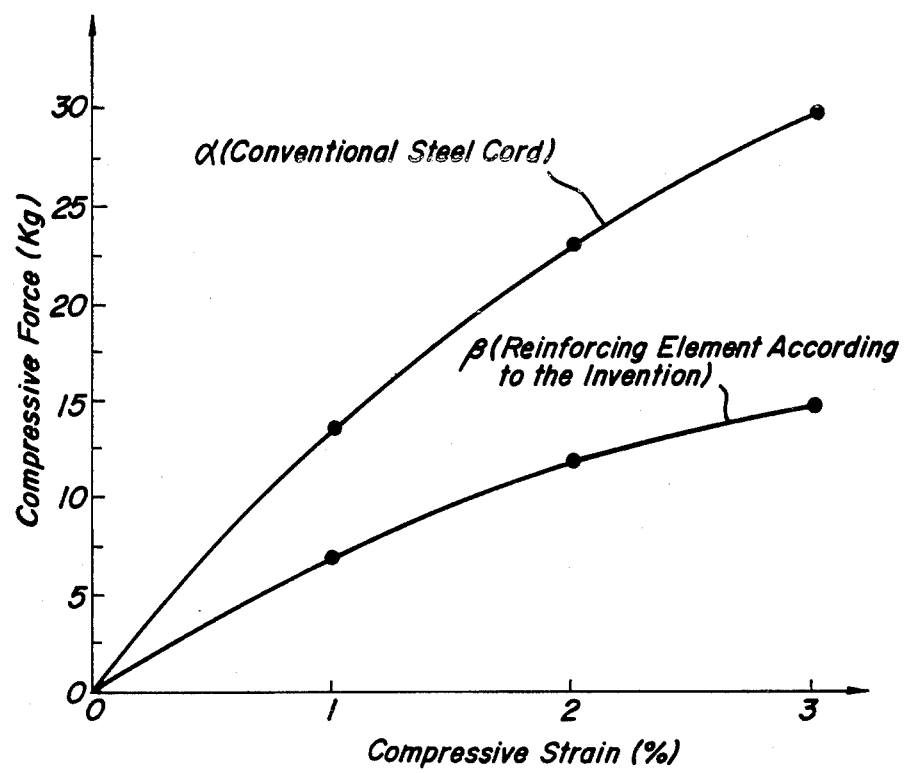
FIG_3b

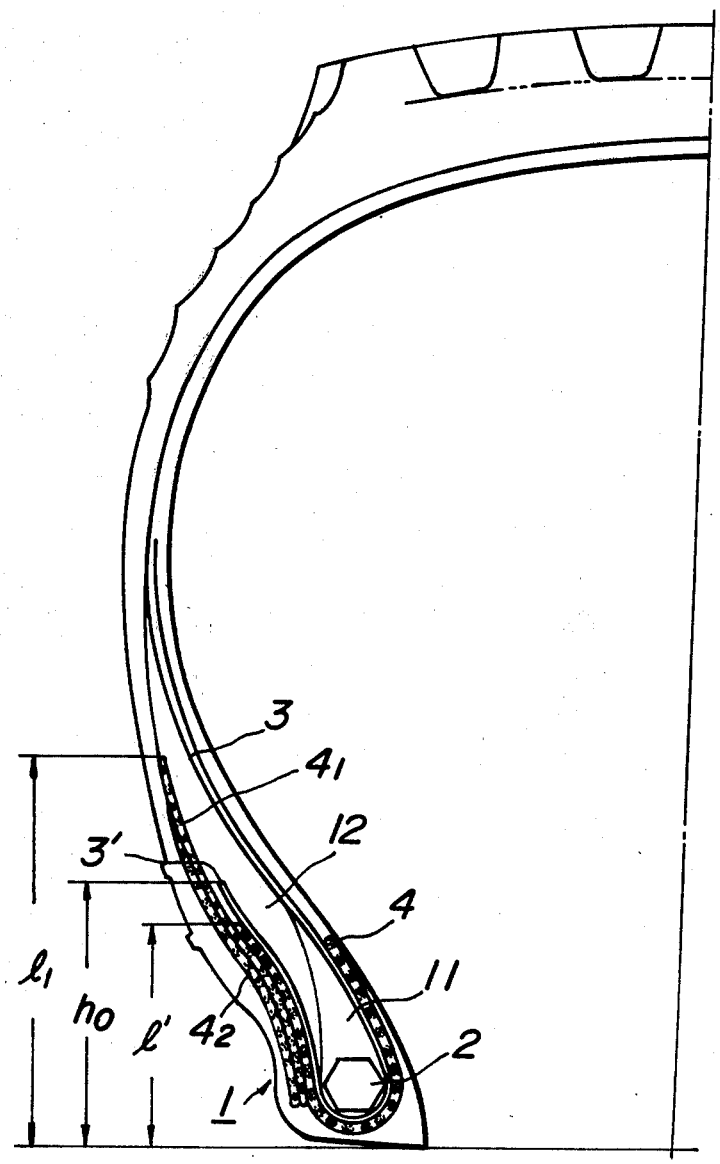

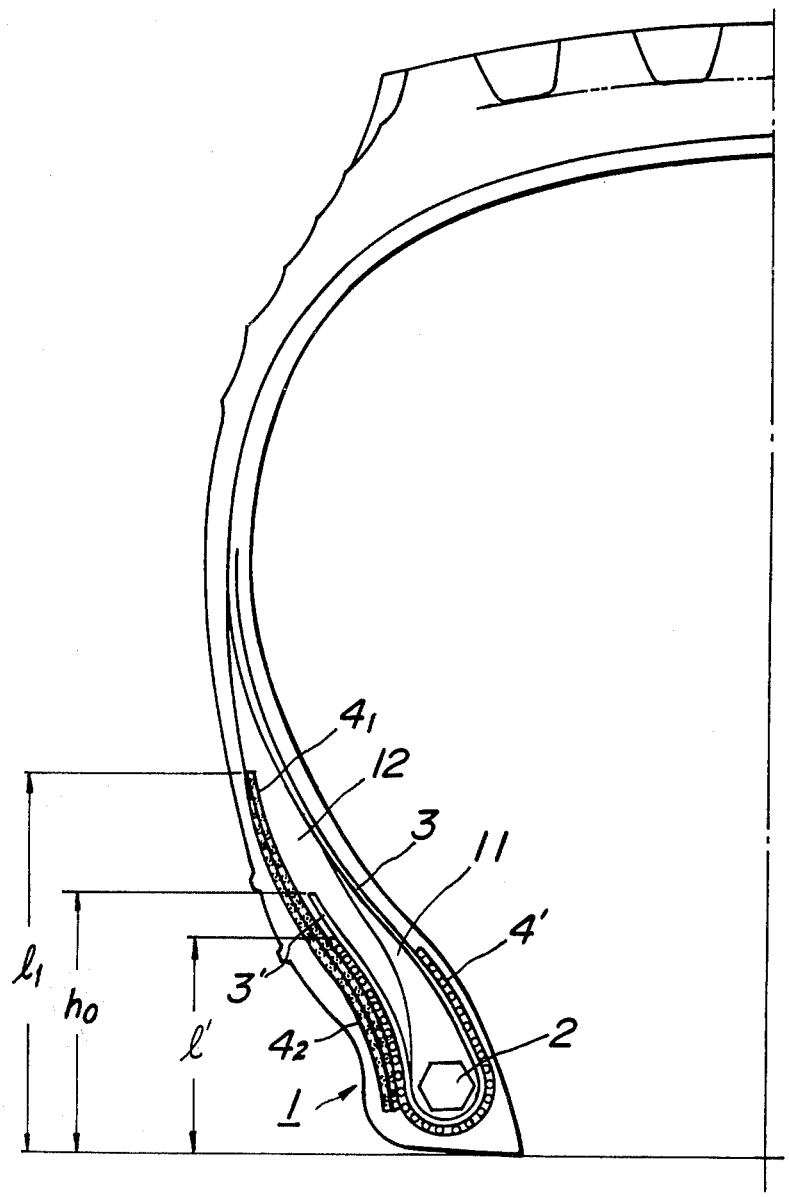

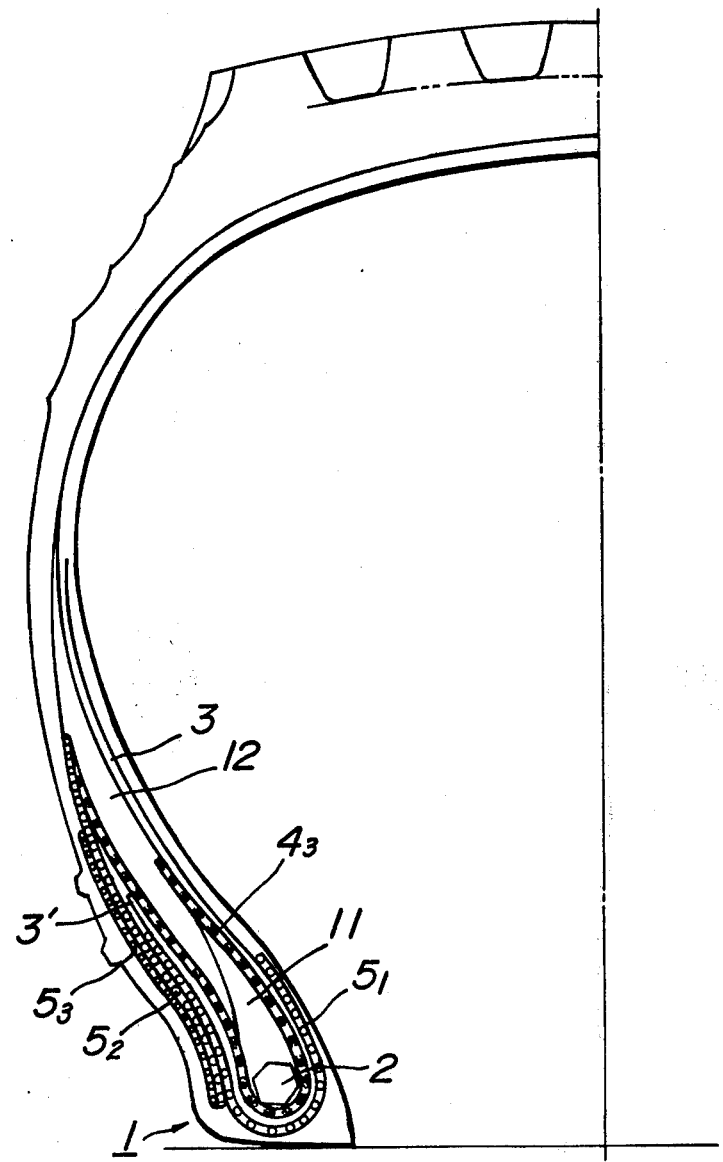

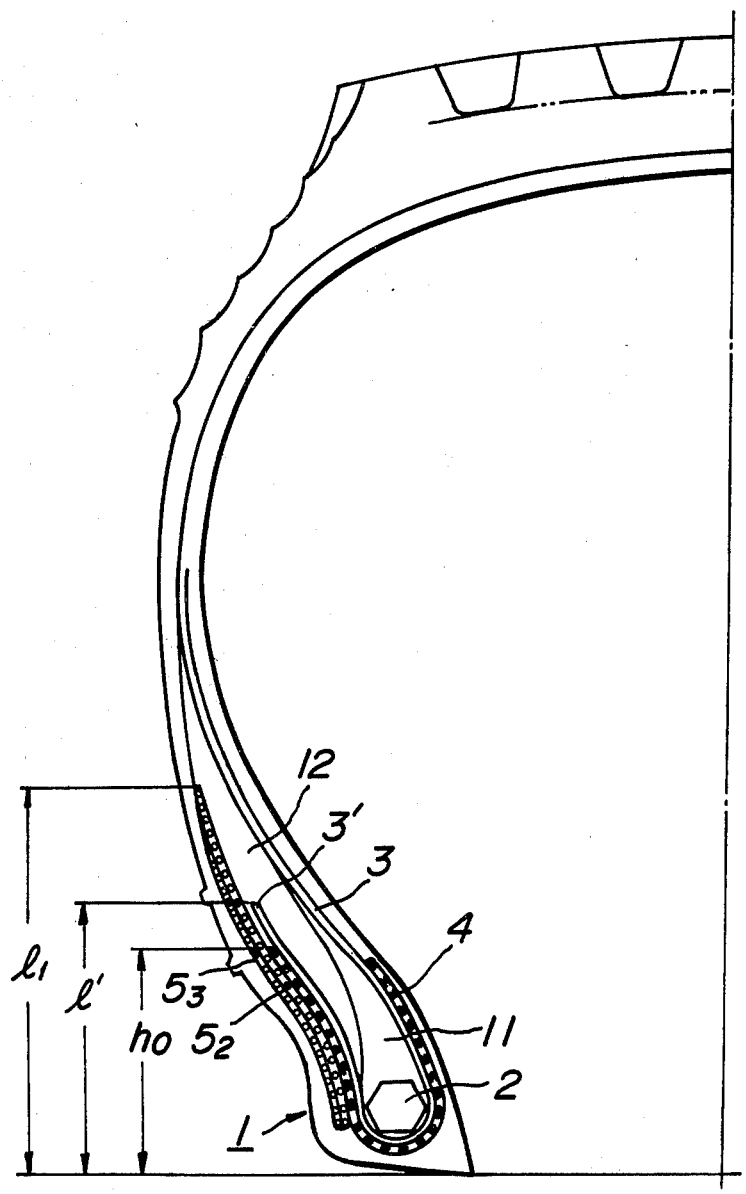

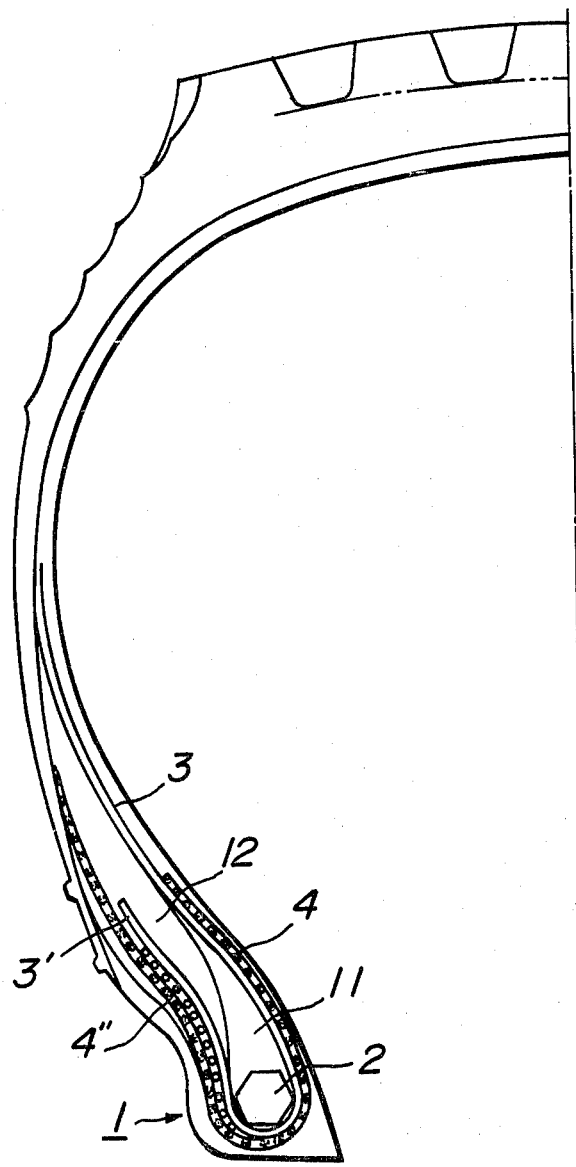

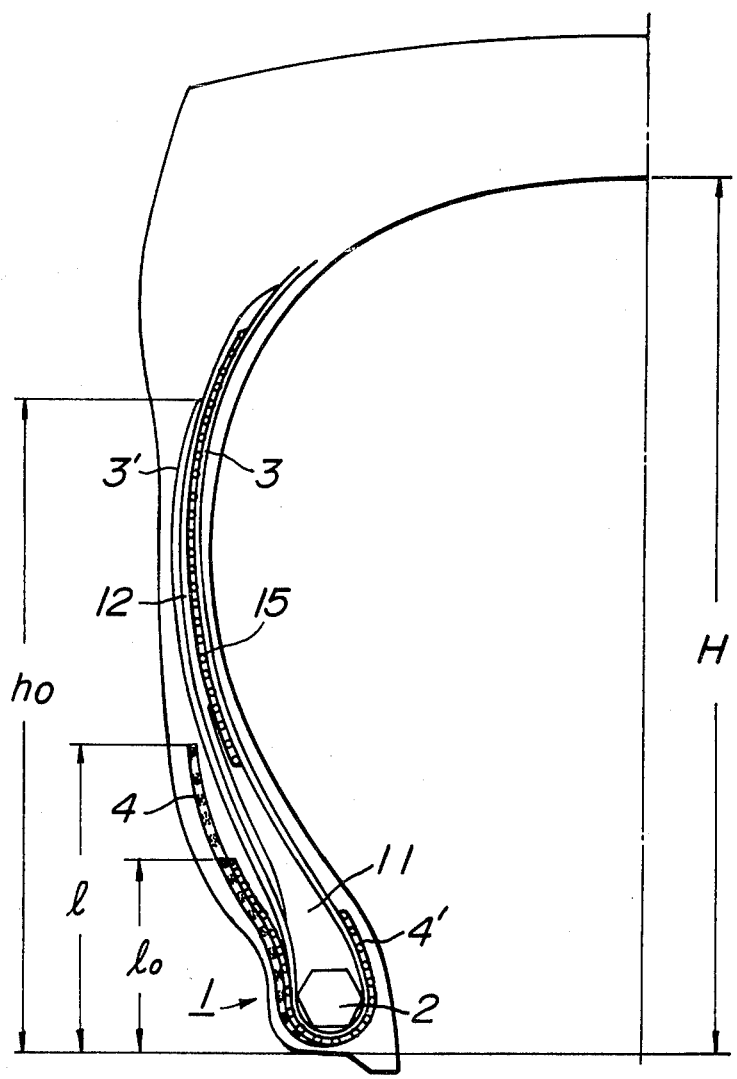

PNEUMATIC RADIAL TIRE HAVING AN IMPROVED BEAD PORTION REINFORCING CONSTRUCTION

This is a continuation, of application Ser. No. 808,947, filed June 22, 1977, now abandoned.

This invention relates to a pneumatic radial tire having an improved bead portion reinforcing construction.

In general, the construction of the bead portion in pneumatic radial or semiradial tires using cords as a reinforcement comprises at least one carcass reinforcement (hereinafter referred to as a carcass ply), which is composed of cords arranged substantially perpendicular to the circumferential direction of the tire and folded outwardly of the tire around a bead ring, a chipper composed of one or more of textile or metal cords, which is also called as a chafer or a flipper, and a hard rubber stock or combination of a hard rubber stock and a soft rubber stock (hereinafter referred to as a stiffener) sandwiched between the carcass ply and its turn-up ply portion.

Such a construction is based on the fact that the rigidity or stiffness of the bead portion is apt to become weak as compared with general pneumatic bias type tires (hereinafter referred to as a bias tire) wherein a plurality of rubberized fabrics composed of textile cords are superimposed one upon the other as the carcass ply.

Furthermore, radial tires have excellent properties such as wear resistance, resistance to puncture and the like as compared with the bias tires because a considerably tough breaker is disposed between a tread rubber and the carcass ply. However, when a radial tire is provided with a chipper composed of metals cords (hereinafter referred to as a metal chipper) which is particularly effective for preventing a defacement of the bead portion at an area contacting with a rim flange (hereinafter referred to as a rim chafing), the metal chipper is secured at least to the bead portion and extended upwardly from at least near the bead base portion to a given height in a radial direction. As a result, the flexible sidewall portion produces a discontinuity of rigidity near the radially outer end of the metal chipper which has a very high rigidity, so that when the tire is deformed under an action of load, the peeling of the metal chipper and the like may occur at the discontinuous area of the rigidity. Such a problem will grow and is liable to cause a separation failure of the metal chipper end, which is a fatal defect in a radial tire of this type.

In order to solve this problem, there have hitherto been proposed a method of arranging an additional textile layer outside or inside a position corresponding to the radially outer end of the metal chipper with respect to the axial direction of tire, a method of accounting the material of the rubber disposed around the radially outer end of the metal chipper and the like, but the premature failure due to the aforementioned peeling phenomenon are not yet solved even by these proposals.

An object of the invention is to provide a pneumatic radial tire having an improved bead portion reinforcing construction which can effectively prevent the failure due to the discontinuity of the rigidity in the bead portion, i.e. the separation failure of the metal chipper end, which is a serious weakpoint in the radial tire, without damaging the rim chafing resistance of the metal chipper.

The inventors have found out from various experimental results that the separation failure of the bead portion is mainly caused by deformation of the bead portion during the running under load.

In FIG. 1a, a typical example of the bead portion having the conventional construction (the other portions of the tire are omitted) is shown as a schematic skeleton. That is, the bead portion 1 comprises a carcass ply 3 composed of metal cords and wound around a bead ring 2 from the inside to the outside thereof, a metal chipper 4 disposed outside the turn-up portion of the ply 3, and a textile chipper 5 disposed outside the metal chipper 4.

In such a bead construction, it has been confirmed from a rigidity curve in the radial direction as shown in FIG. 1b that when the bead portion 1 is deformed, the change of rigidity $\theta$ occurs at discontinuous points of rigidity 3a, 4a and 5a, and particularly the change of rigidity at the radially outer end 4a of the metal chipper 4 is large.

As a result, the phenomenon of stress concentration occurs near the discontinuous points of rigidity. The inventors have made further investigations with respect to such phenomenon and found out that the rigidity change $\theta$ is related to a crack growth (or peeling) at the end 4a of the metal chipper as shown in FIG. 2.

As seen from the result of FIG. 2, the large rigidity change $\theta$ brings about significant crack growth or separation failure.

The inventors have made various studies with respect to the bead construction aimed at the cord structure of the metal chipper and have discovered a novel structure of the metal chipper which has never been seen in the prior art and is very advantageous in view of cost. With this structure, the discontinuity of rigidity and cracks are hardly caused or if the cracks are caused, the growth of cracks are effectively suppressed without damaging the rim chafing resistance of the metal chipper.

That is, the invention lies in that a reinforcing element composed of a helically formed metal filament is used in the metal chipper.

According to the invention, the feature of preventing the separation failure liable to be caused at the end of the metal chipper is achieved by using helically formed filament(s) as a reinforcing element for the metal chipper and particularly, selecting a modulus of elasticity of the reinforcing element at a proper value. The term "modulus of elasticity of reinforcing element" used herein means a value calculated from the equation $$a / \left( \frac{b}{100} \right) \times S,$$

wherein a is a tension in kg within a proportional limit (resilience recovering range) when the tension is applied to the helically formed filament or a bundle of at least two helically formed filaments, b is an elongation in % of the reinforcing element (refer to FIG. 3a), and S is an effective cross-sectional area in mm² of the reinforcing element.

The reinforcing element composed of the helically formed metal filament to be used in the invention is extremely deformable so as to reduce the amount of relative displacement between the rubber and the reinforcing element. As a result, it is possible to reduce the separation failure at the ends of the reinforcing element. Especially, when the reinforcing element is composed of a plurality of the helically formed filaments, the filaments are not twisted together as in the case of the steel cords, but are merely assembled together without twisting at random. Thus, it is possible to sufficiently penetrate the rubber into gaps formed between the filaments and mechanical bonding force thus produced can compensate for insufficient rubber-to-filament chemical bonding force.

The use of the reinforcing element composed of the helically formed filament according to the invention ensures a significant reduction of the compression modulus of elasticity of the reinforcing element, so that the reinforcing element can absorb the compressive force instantaneously subjected thereto, thereby significantly decreasing stress concentration, rapid change of rigidity and the like.

The invention will now be described in greater detail with reference to the accompanying drawings, wherein:

FIG. 1a is a schematic illustration of the conventional bead portion reinforcing construction;

FIG. 1b is a graph showing a change of rigidity in radial direction at corresponding cord end of each reinforcing member in the bead portion shown in FIG. 1a;

Figure 2:
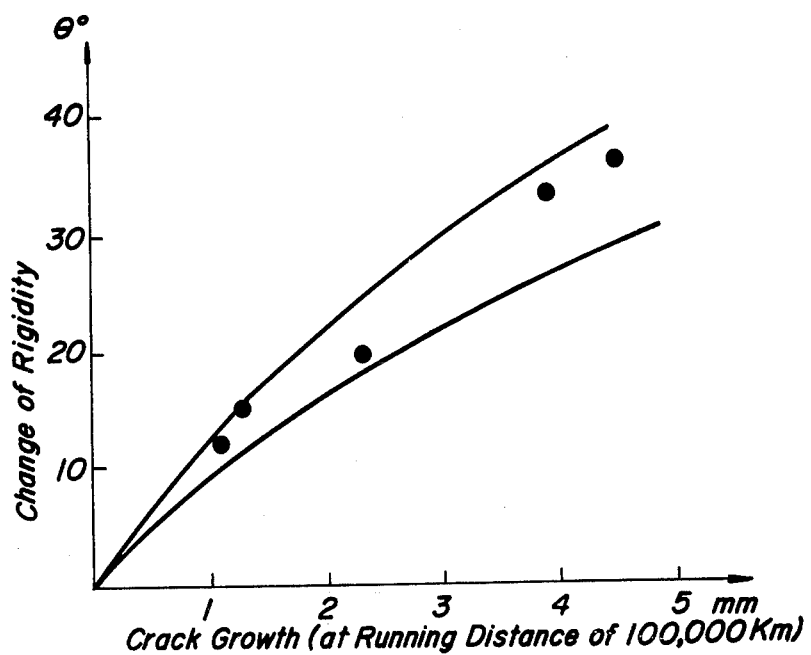
FIG. 2 is a graph showing a relation between the change of rigidity and the crack growth.
Figure 3C:
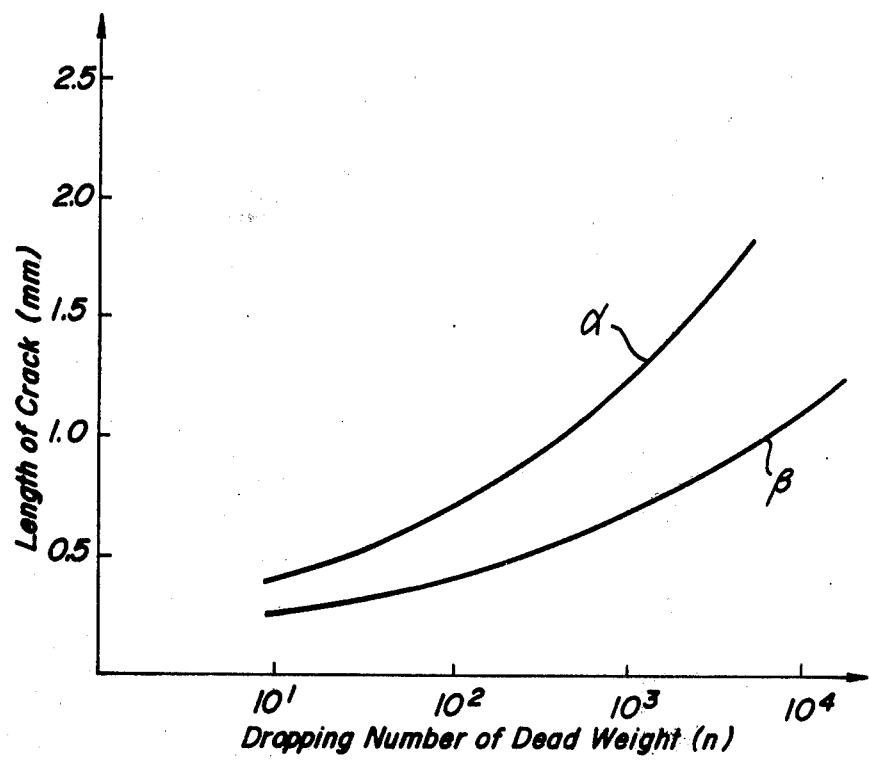
Figure 3D:
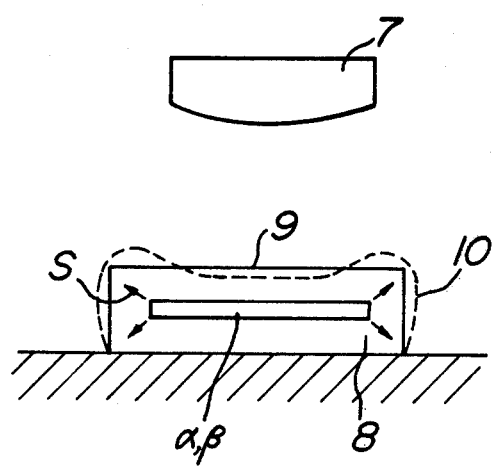
Figure 4A:
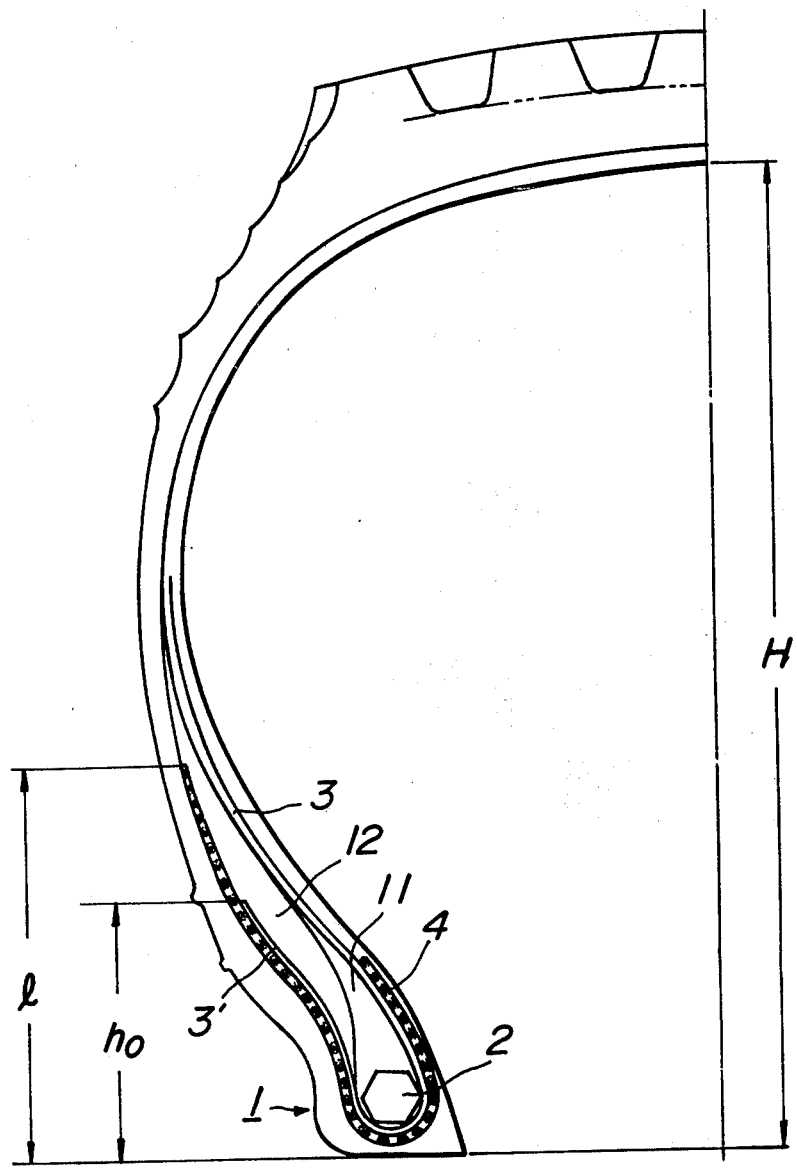
Figure 5A:
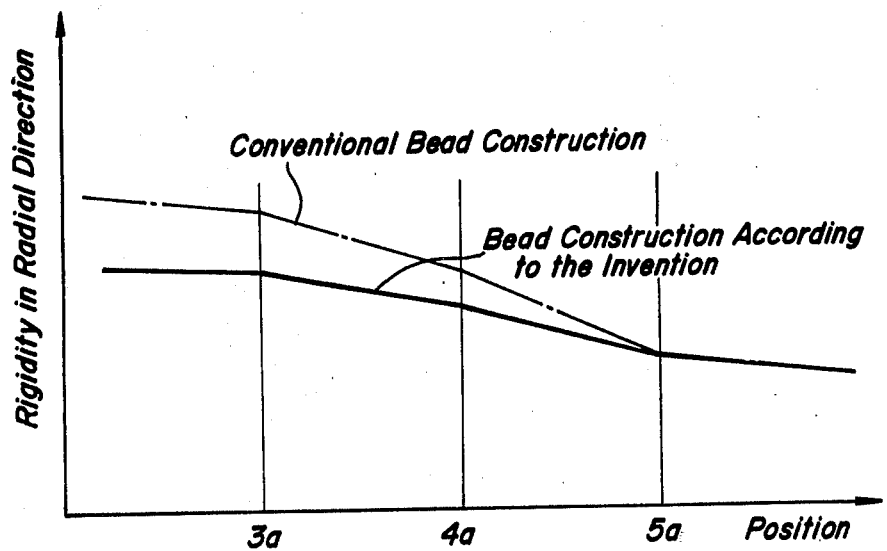
Figure 5B:
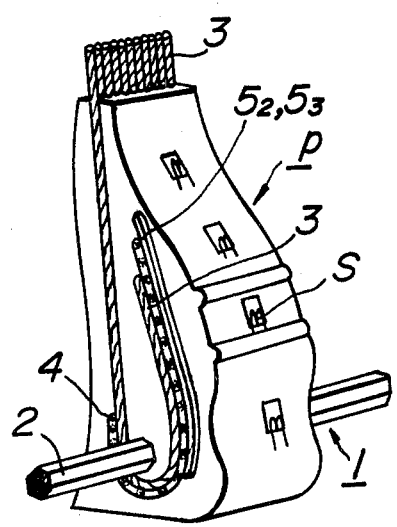
Figure 5C:
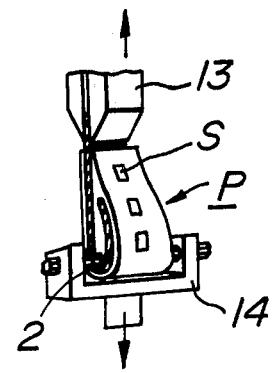
Figure 6:
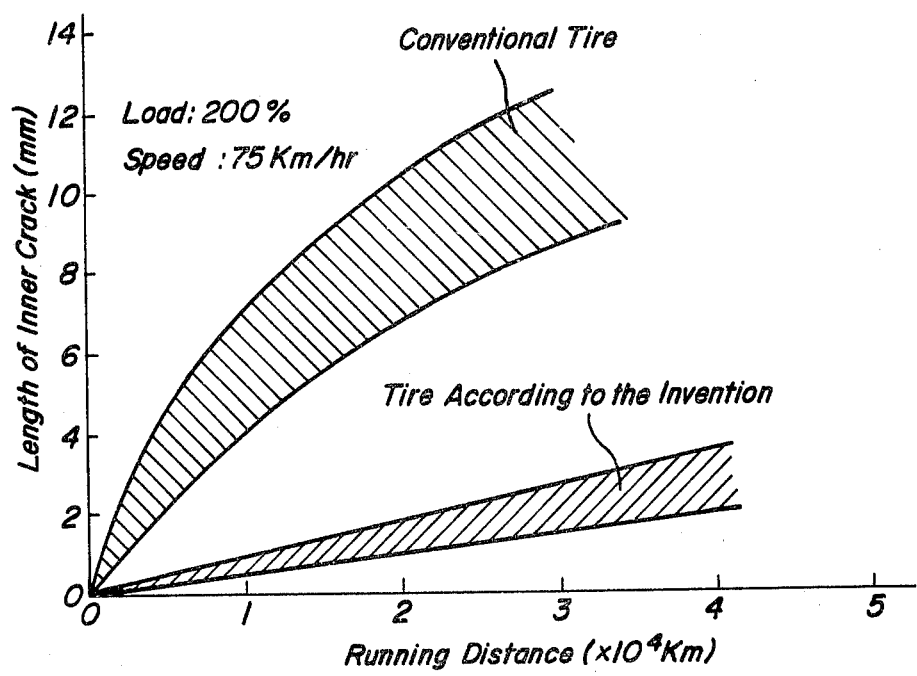
Figure 7A:
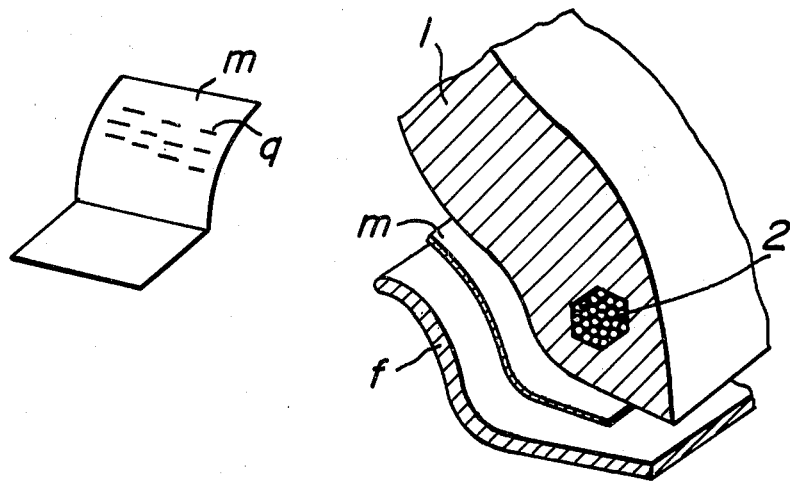
Figure 7B:
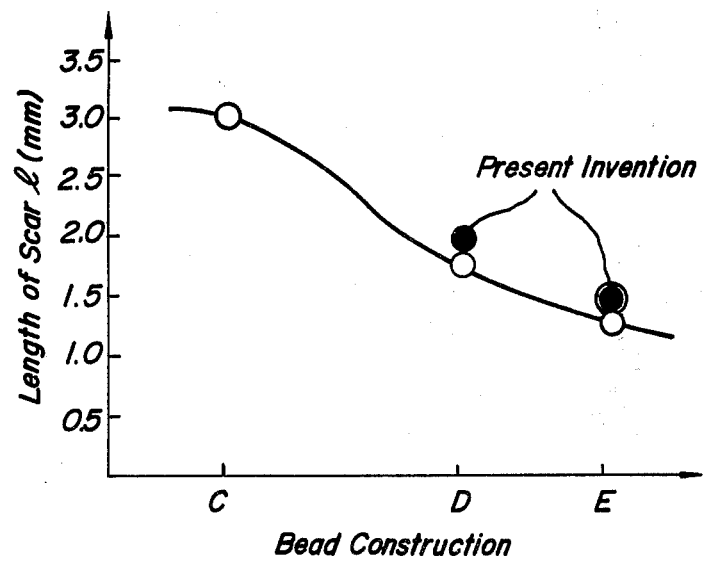
Figure 8B:
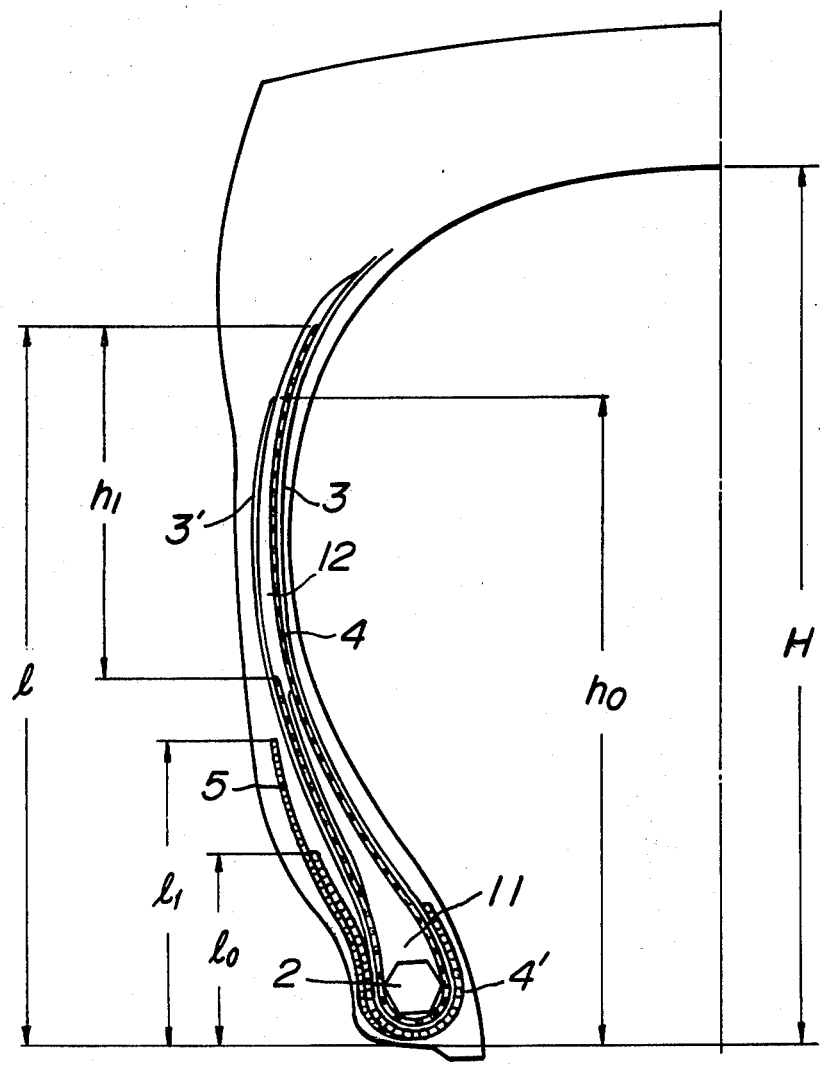
Figure 9A:
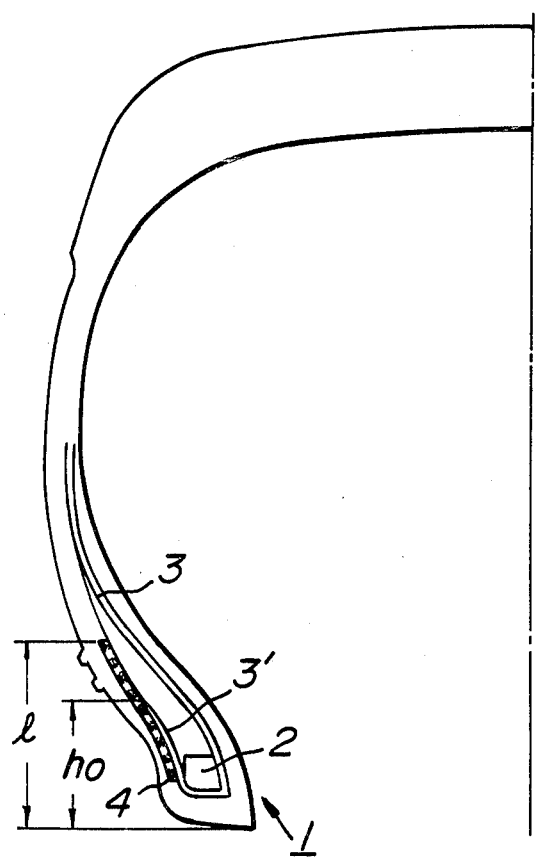
Figure 9B:
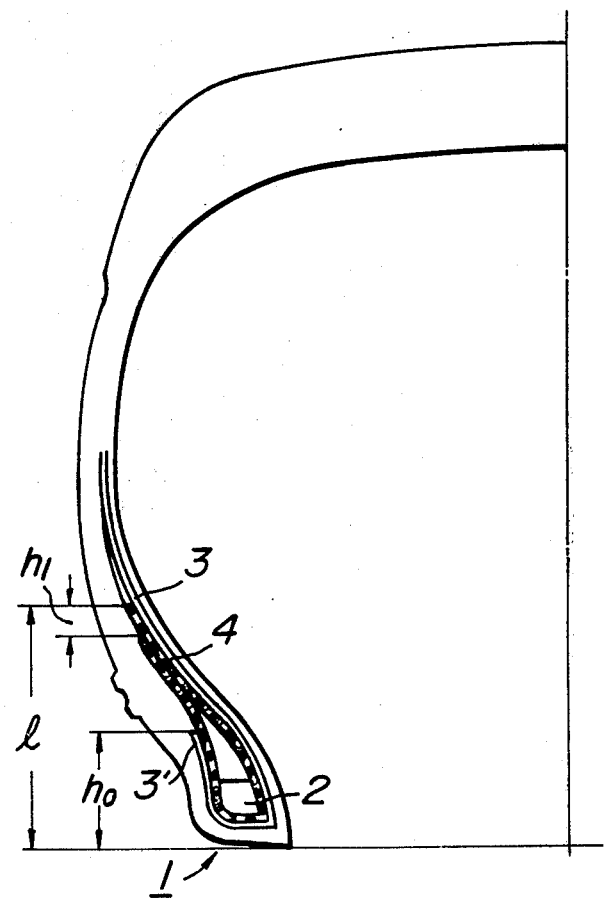

FIGS. 3(I) to 3(III) are illustrations showing the appearance, cross section and a bundle of helically formed filaments for constituting the reinforcing element according to the invention;

FIG. 3a is a graph illustrating a comparison of the reinforcing element according to the invention with a conventional steel cord for the force and elongation;

FIG. 3b is a graph illustrating a comparison of the reinforcing element according to the invention with the conventional steel cord for the compression modulus of elasticity;

FIG. 3c is a graph illustrating a comparison of the reinforcing element according to the invention with the conventional steel cord for crack growth by a drop impact test;

FIG. 3d is an illustrative view of an embodiment of a drop impact test;

FIGS. 4a and 4g are cross-sectional views showing one half of various modified embodiments of the tire for a bus or truck according to the invention, respectively, parts being shown in vertical center section through the rotational axis of the tire;

FIG. 5a is a graph illustrating a comparison of the tire according to the invention with a conventional tire for the change of rigidity in radial direction;

FIG. 5b is a perspective view of a test piece for measuring the change of rigidity in the radial direction;

FIG. 5c is an illustrative view showing a measurement for the change of rigidity in the radial direction;

FIG. 6 is a graph showing a relation between the running distance and the length of an inner crack in the tire according to the invention and the conventional tire;

FIG. 7a is an illustrative view of a rim chafing test;

FIG. 7b is a graph illustrating results of the rim chafing test of the tire according to the invention as compared with those of the conventional tire;

FIGS. 8a and 8b are cross-sectional views showing one half of various modified embodiments of the tire for construction vehicles according to the invention, respectively; and FIGS. 9a and 9b are cross-sectional views showing one half of various modified embodiments of the tire for passenger cars according to the invention, respectively.

The invention is generally applied to pneumatic radial tires and has the following preferably construction. That is, the present invention lies in a pneumatic radial tire comprising a carcass body composed of radially or semi-radially arranged ply cords, a belt for reinforcing a crown portion of the carcass body and a bead portion reinforcing band disposed along a bead portion formed by folding the ply of the carcass body around a bead ring, said bead portion reinforcing band comprising at least one chipper layer. This chipper is used as follows.

(a) Arrangement

The chipper composed of a reinforcing element is arranged at an area corresponding to the turn-up portion of the carcass ply and extended from at least the bead base portion in radial direction at a given angle inclined with respect to the turn-up portion.

(b) Arrangement of reinforcing element

The reinforcing element is inclined at an angle of 10°–80°, preferably 30°–60° with respect to the cord of the carcass ply.

(c) Structure of reinforcing element
  (i) The reinforcing element is formed of helically formed metal filament(s) and has a modulus of elasticity of $0.029 \times 10^4$ to $1.60 \times 10^4$ kg/mm$^2$, preferably $0.04 \times 10^4$ to $1.10 \times 10^4$ kg/mm$^2$, more preferably $0.06 \times 10^4$ to $0.15 \times 10^4$ kg/mm$^2$.
  (ii) The reinforcing element has a compression modulus of elasticity of 20 to 300 kg/cm$^2$ as mentioned later relating to FIG. 3b.
  (iii) The filament diameter of the helically formed filament is within a range of 0.1 to 1.0 mm, preferably 0.13 to 0.5 mm.
  (iv) The number of the helically formed filaments is 1 to 50, preferably 2 to 30.
  (v) The ratio of maximum diameter Dmax to minimum diameter Dmin in an outer contour projected on a plane perpendicular to the axial direction of one pitch of the filament is preferably within a range of 1 to 1.5.
  (vi) The ratio of an average diameter $$D\left(\frac{Dmax + Dmin}{2}\right)$$

of an outer contour projected on a plane perpendicular to the axial direction of one pitch of the filament to the filament diameter $\phi$ is within a range of 2 to 20, preferably 3 to 15.
  (vii) When a plurality of helically formed filaments are formed into a bundle, they are merely assembled together without twisting at random and without aligning the filaments and without twisting them together by means of exterior binding wires.

(d) The chipper is composed of the reinforcing element embedded in rubber having 100% modulus of elasticity of 20 to 90 kg/cm$^2$, preferably 30 to 80 kg/cm$^2$.

According to the invention, the reinforcing element composed of the helically formed metal filament is used as the chipper in the bead portion reinforcing band. As shown in FIGS. 3(I) to 3(III), the ideal shape of an outer contour projected on a plane perpendicular to the axial direction of one pitch of the helically formed filament 6 should be a true circle, i.e. Dmax/Dmin = 1 for the purpose of equalizing the stress subjected to it. However, it is very difficult in practice to obtain such a true circle and a number of steps are required in order to incorporate such filament into the tire, thus making it further difficult to maintain such true circle in the tire product. Experimental tests and considerations on practically allowable deviation from such true circle have yielded the result that if the ratio of maximum diameter (Dmax) of the outer contour projected on a plane perpendicular to the axial direction of one pitch of the helically formed filament to minimum diameter (Dmin) thereof lies within a range of 1 to 1.5, the stress subjected to the filament becomes substantially uniformly distributed, and that hence premature fatigue breakage is not induced.

In addition, the average diameter $$D\left(\frac{Dmax + Dmin}{2}\right)$$

of the outer contour projected on a plane perpendicular to the axial direction of one pitch of the helically formed filament 6 is required to be within a range of $2\phi$ to $20\phi$ in relation to the filament diameter $\phi$ of the helically formed filament 6.

The filament diameter $\phi$ of the helically formed filament is required to be within a range from 0.1 mm to 1.0 mm. When the filament diameter is less than 0.1 mm, breakage and other defects are caused in the step of shaping the filament, while when the filament diameter is larger than 1.0 mm, shaping is difficult and the properties of the bundle composed of the filaments 6 are poor.

The modulus of elasticity of the reinforcing element is defined by a proportional constant within a proportional limit of the stress-strain curve shown in FIG. 3a and is required to be not less than $0.029 \times 10^4$ kg/mm$^2$ in view of the rim chafing resistance. When the modulus of elasticity is more than $1.60 \times 10^4$ kg/mm$^2$, the resistance to separation failure is poor.

Therefore, the modulus of elasticity of the reinforcing element according to the invention is $0.029 \times 10^4$ kg/mm$^2$ to $1.60 \times 10^4$ kg/mm$^2$, preferably $0.04 \times 10^4$ kg/mm$^2$ to $1.10 \times 10^4$ kg/mm$^2$, more preferably $0.06 \times 10^4$ kg/mm$^2$ to $0.15 \times 10^4$ kg/mm$^2$.

Moreover, the modulus of elasticity of the reinforcing element is optionally changed by varying the pitch, filament diameter and the like of the helically formed filament 6. That is, according to the invention novel pneumatic radial tires having a high-durable bead portion reinforcing element are optionally changed by varying the pitch, filament diameter and the like of the helically formed filament 6. Also, according to the invention novel pneumatic radial tires having a high-durable bead portion reinforcing construction, wherein a chipper having a significantly high resistance to separation failure without damaging the performance inherent to the chipper is incorporated into the bead portion, are provided by using the helically formed filaments as the reinforcing element of the chipper and selecting an optimum modulus of elasticity of the reinforcing element.

Furthermore, the reinforcing element $\beta$ is preferably constituted by merely assembling 1 to 50 of helically formed filaments 6 in view of the strength, rigidity, compression modulus of elasticity and the like as the reinforcing element. The use of more than 50 helically formed filaments is not required in view points of the increase of gauge of the reinforcing element $\beta$ and the rim chafing resistance and is unfavorable due to the discontinuity of rigidity at the radially outer end 4a as mentioned above.

When the reinforcing element $\beta$ composed of such helically formed filament(s) 6 is used in the chipper, the number of the reinforcing elements $\beta$ used is required to lie within a range from at least 10 elements/5 cm to 50 elements/5 cm. The use of more than 50 elements/5 cm is restricted from point of view of discontinuity of rigidity and the problem in the production of the reinforcing element $\beta$.

In regard to the invention, investigations have been made with respect to an optimum construction using the reinforcing element as the metal chipper 4 and as a result, it has been found out that it is also effective to arrange the chipper along the stiffener 11 inside the turn-up portion of the carcass ply 3 in addition to arranging outside the turn-up portion as shown in FIG. 1a. In any case, the radially inner end of the metal chipper 4 is required to extend to the bead base portion B as shown in FIG. 1a, but may be further folded inwardly around the bead ring 2.

Further, it has been confirmed that the radially outer end 4a of the metal chipper 4 should be positioned at a distance of at least 5 mm higher or lower than the turn-up end 3a of the carcass ply 3 so as to avoid problems such as the discontinuity of rigidity, continuity of cracks and the like.

The reinforcing element $\beta$ of the metal chipper 4 is preferably inclined at an angle of at least 10° to 80° with respect to the cord of the carcass ply 3 in view of the rim chafing resistance, the workability in tire production and the like.

Moreover, it has been confirmed that the combination of the metal chipper with a textile chipper is considerably effective as shown in FIGS. 1a, 4d, 4e and 4f.

In order to make the characteristics of the reinforcing element $\beta$ itself clear, a stress-strain curve of the reinforcing element $\beta$ composed of the helically formed filament 6 is shown in FIG. 3a wherein an ordinate is a force in kg/cord or kg/bundle and an abscissa is an elongation in %.

As seen from FIG. 3a, the conventional steel cord $\alpha$ (strand construction of $1 \times 5$, cord diameter $\phi$: 2.25 mm) is fairly poor in the elongation to the reinforcing element $\beta$ composed of the helically formed steel filaments 6 (filament diameter $\phi$: 0.25 mm, average diameter D of an outer contour projected on a plane perpendicular to the axial direction of one pitch of the filament: 0.95 mm, $$\frac{Dmax}{Dmin} = 1.25, \frac{D}{\phi} = 3.8,$$

pitch; 10.5 mm, number of filaments; 5).

In other words, the elongatable reinforcing element $\beta$ can be determined by properly selecting the average diameter D, filament diameter $\phi$ and the like of the helically formed filament 6. On the contrary, if the same elongation is given to the conventional stranded steel cord, serious in regard to effect and cost.

In FIG. 3b are shown compression test results. In FIG. 3b, the compressive force in kg is taken on the ordinate and the compressive strain in % is taken on the abscissa. In this test, use was made of two test pieces, one of which being composed of a cylindrical rubber containing one conventional standard steel cord embedded therein and the other being composed of a cylindrical rubber containing the reinforcing element composed of one bundle of the helically formed filaments according to the invention embedded therein.

In FIG. 3b, a full line curve α shows the conventional stranded steel cord (strand construction: 1×5, filament diameter φ: 0.20 mm, cord diameter: 0.68 mm), a full line curve β shows the reinforcing element composed of the helically formed steel filament according to the invention (filament diameter φ: 0.20 mm, average diameter D of an outer contour projected on a plane perpendicular to the axial direction of one pitch of the filament: 0.95 mm, $$\frac{D_{max}}{D_{min}} = 1.25, \frac{D}{\phi} = 3.8,$$

pitch: 10.5 mm, number of filaments: 5). It is a matter of course that the rubber of all of these two test pieces is of the same rubber compound.

As seen in FIG. 3b, the reinforcing element β composed of the helically formed steel filament 6 according to the invention has a compression modulus of elasticity lower than that of the conventional stranded steel cord α. The compression modulus of elasticity of the former becomes fairly close to that of the rubber having no reinforcing element.

Moreover, the compression modulus of elasticity can freely be selected in compliance with the actual requirement. In case of the metal chipper 4, it has been found that the compression modulus of elasticity is required to be within a range of 20 to 300 kg/cm² judging from the discontinuity of rigidity, rim chafing resistance and the like.

In FIG. 3c are shown model test results of crack growth with respect to the conventional stranded steel cord α and the reinforcing element α composed of the helically formed filament 6 according to the invention.

FIG. 3d illustrates a method of practising the model test, wherein a dead weight 7 composed of a metal and having a weight of 60 kg is dropped from a height of 40 cm on upper surfaces of two test pieces, one being composed of a rectangular rubber body (40 cm×50 cm×2.5 cm) containing the conventional stranded steel cord α (length: 50 cm) embedded therein and the other being composed of the rectangular rubber body containing the reinforcing element β embedded therein. By dropping the dead weight 7, an outer contour 9 of the test piece is deformed into a shape shown by dotted lines 10 and as a result, a rubber component 8 near both ends of the conventional steel cord α or the reinforcing element β produces a strain in a direction shown by arrows S. This end is subjected to repeating strain by repeating the dropping of the dead weight.

In FIG. 3c, along the abscissa n is the number of droppings of the dead weight 7 and along the ordinate is a length of crack measured from the end of the cord or element in mm.

As seen from FIG. 3c, the reinforcing element β composed of the helically formed filament 6 according to the invention is effective for controlling the time and speed of crack occurrence as compared with the conventional steel cord α. This is considered to be due to the fact that the concentration of stress is small at the section of the end portion of the reinforcing element β rather than at that of the steel cord α.

The invention will now be described in greater detail with reference to practical examples.

FIGS. 4a to 4g are partially cross-sectional views of various embodiments of a pneumatic radial tire for truck and bus having a size of TBR 10.00R 20 14PR, wherein the metal chipper 4 containing the reinforcing element β composed of helically formed metal filament(s) according to the invention is used as at least part of the bead portion reinforcing band, respectively.

In all embodiments, stiffeners 11 and 12 are arranged between the carcass ply 3 and the turn-up portion 3' of the carcass ply 3 attaching the metal chipper 4. This stiffener 11 is formed of rubber having a Shore A hardness of 78° and 100% modulus of elasticity of 65 kg/cm² and the stiffener 12 is formed of rubber having a Shore A hardness of 58° and 100% modulus of elasticity of 28 kg/cm².

The carcass ply 3 is composed of one rubberized carcass ply formed of steel cords having a cord diameter of 0.15 mm and a strand construction of 1×3+5×7+1 and arranged in a radial plane of the tire. The reinforcing element β of the metal chipper 4 is inclined at an angle of 60° with respect to the cord direction of the carcass ply 3.

The helically formed filament 6 for the reinforcing element β has filament diameter φ of 0.25 mm, average diameter D of an outer contour projected on a plane perpendicular to the axial direction of one pitch of the filament of 3.8φ, $$\frac{D_{max}}{D_{min}} = 1.25$$

and pitch of 10.5 mm. The reinforcing element β is composed by merely assembling 10 helically formed filaments together without twisting at random and without aligning the filaments and has a modulus of elasticity of 0.41×10⁴ kg/mm². The reinforcing elements β are embedded in a rubber having 100% modulus of elasticity of 65 kg/cm² at ends of 26 elements/5 cm to form a bead portion reinforcing band.

In FIG. 4a is shown the tire using single metal chipper 4 composed of the reinforcing element β according to the invention as the bead portion reinforcing band, wherein the metal chipper 4 is extended downwardly from a point higher than the upper end of the turn-up portion 3' of the carcass ply 3 and folded around the head ring 2 from the outside to the inside thereof along the inner surface of the carcass ply 3, the distance between the upper end of the metal chipper 4 and the upper end of the turn-up portion 3' being 20 mm, i.e. l=80 mm and h₀=60 mm.

In FIG. 4b is shown the tire using a main metal chipper 4 of the reinforcing element β and two auxiliary metal chippers 4₁ and 4₂ as the bead portion reinforcing band, wherein the main metal chipper 4 is folded around the bead ring 2 from the inside thereof along the carcass ply 3 and extended upwardly to a point lower than the upper end (h₀=60 mm) of the turn-up portion 3' of the carcass ply 3 (i.e., the point is l'=50 mm) and the two auxiliary metal chippers 4₁ and 4₂ are arranged from a bead heel to a height l₁ of 80 mm outside the main metal chipper 4 on the turn-up portion 3' of the carcass ply 3.

In the second embodiment, the reinforcing element β composed of 5 helically formed filaments is used for the auxiliary metal chippers 4₁ and 4₂, respectively.

In FIG. 4c is shown a modified embodiment of the tire shown in FIG. 4b, wherein a chipper 4' composed of stranded steel cords having a cord diameter of 0.17 mm and a strand construction of 1×3×9+15+1 is used instead of the main metal chipper 4. Moreover, the auxiliary metal chippers $4_1$ and $4_2$ are the same as used in the embodiment of FIG. 4b.

In the above three embodiments, the metal chipper is used as a chafer. On the other hand, an embodiment of using the metal chipper as a flipper is shown in FIG. 4d. In this case, a metal chipper $4_3$ is constituted with the reinforcing element $\beta$ composed of the helically formed filament(s) 6 and folded around the bead ring 2 from the inside to the outside thereof between the bead ring 2 and the carcass ply 3 and extended upwardly over the upper end of the turn-up portion 3' of the carcass ply 3. As shown in FIG. 4d, a chafer $5_1$ reinforced with conventional steel cords and chafers $5_2$ and $5_3$ each reinforced with nylon cords are further arranged outside the carcass ply 3, the turn-up portion 3' of the carcass ply 3 and the metal chipper $4_3$.

Figure 4E:
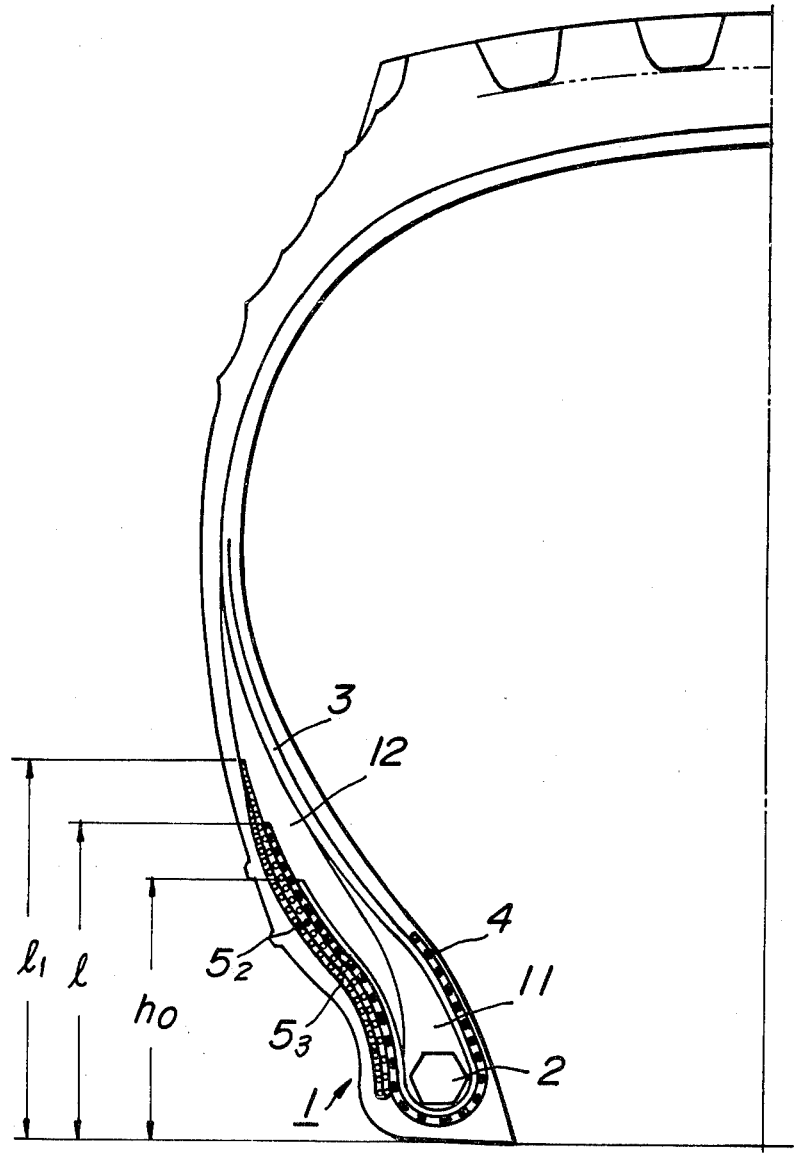

In FIG. 4e is shown a modified embodiment of the tire shown in FIG. 4a, wherein two nylon chafers $5_2$ and $5_3$ are further arranged outside the metal chipper 4 and extended upwardly to a point $l_1$ higher than the upper end l of the metal chipper 4.

In FIG. 4f is shown a modified embodiment of the tire shown in FIG. 4b, wherein two nylon chafers $5_2$ and $5_3$ are used instead of the two auxiliary metal chippers $4_1$ and $4_2$.

In FIG. 4g is shown a modified embodiment of the tire shown in FIG. 4a, wherein a steel cord chafer 4" is arranged between the metal chipper 4 and the turn-up portion 3' of the carcass ply 3 so as to extend downwardly from a certain point lower than the upper end of the turn-up portion 3' to a bead heel.

In FIG. 5a is shown test results of the rigidity of the tire shown in FIG. 4e as compared with those of the conventional tire having a bead portion reinforcing construction shown in FIG. 1a. In this test, a test piece P of bead portion as shown in FIG. 5b is used. That is, the test piece is constructed by combining the metal chafer 4 composed of the reinforcing element $\beta$ made of the helically formed filament(s) 6 with the two nylon chafers $5_2$ and $5_3$ as shown in FIG. 4e. As shown in FIG. 5c, a tension is applied to the test piece P between a clamp 13 and a receiver 14 after both ends of the bead wire 2 extending sidewardly for freely rotating the carcass ply 3 around the bead 2 are fixed to the receiver 14, during which a value of strain is measured by means of strain gauges S mounted on the outer surface of the rubber outside the chafers in places. From the applied tension ($\sigma$) and the measured strain ($\epsilon$), a rigidity in radial direction (E) is calculated according to a Hooke's law of $\sigma = E\epsilon$. In FIG. 5a, an abscissa represents a position of each of the upper ends $3a$, $4a$ and $5a$ of the turn-up portion 3' of the carcass ply 3, the metal chafer 4 and the nylon chafers $5_2$, $5_3$ and an ordinate is a rigidity in radial direction.

As seen from FIG. 5a, the curve of the rigidity in the bead portion having the bead portion reinforcing construction according to the invention is more smooth as compared with that of the conventional bead construction.

In FIG. 6 is shown a relation between the running distance and the length of crack generated at the upper end $4a$ of the metal chipper in the tire according to the invention and the conventional tire. This test was carried out under such conditions that a load is 2 times higher than the standard load (JIS-D4202) and a running speed is 75 km/hr.

As seen from FIG. 6, the tire according to the invention is more effective for preventing the crack growth as compared with the conventional tire.

In FIG. 7b is shown test results of the rim chafing resistance, which is a most important factor in the tire of this type. As shown in FIG. 7a, a soft thin metal sheet m is inserted between the bead portion 1 and a rim flange f and scars q formed on the surface of the sheet m in the circumferential direction are measured so as to determine a relative chafing amount in the circumferential direction of tire. In general, the smaller the length l of the scar q, the more the rim chafing resistance is improved. In FIG. 7b, an abscissa shows a bead portion reinforcing construction and an ordinate is the length l of the scar q. In the abscissa, capital letter C represents a construction using only a textile cord chipper as the reinforcement, capital letter D respresents a construction using only a metal cord chipper as the reinforcement, and capital letter E represents a construction using a metal cord chipper together with two textile cord chippers as the reinforcement. In FIG. 7b, symbol      is the tire having the conventional bead portion reinforcing construction, symbol      is the tire using the reinforcing element $\beta$ according to the invention instead of the conventional method cord chipper, and symbol      is the tire using the reinforcing element $\beta$ according to the invention instead of the conventional metal cord chipper together with two textile cord chippers.

As seen from FIG. 7b, the rim chafing resistance of the tire according to the invention is substantially equal to that of the conventional tire.

In FIGS. 8a and 8b are shown pneumatic radial tires for construction vehicles according to the invention, respectively. In the embodiment of FIG. 8a, the bead portion reinforcing construction is so constructed that a carcass ply 3 composed of steel cords having a cord diameter of 0.21 mm and a strand construction of 7×7+1 (J771) and arranged downwardly in a radial plane of the tire from a maximum height H of 422 mm is folded around a bead ring 2 from the inside to the outside thereof and extended upwardly to such an extent that an upper end of the turn-up portion 3' of the carcass ply 3 terminates at a height $h_0$ of 350 mm higher than a position corresponding to the maximum width of the carcass ply 3, and a protection ply 15 composed of steel cords having a cord diameter of 0.23 mm and a strand construction of 3×7 is disposed between the carcass ply 3 and the turn-up portion 3' thereof along the carcass ply 3 up and down from the position of the maximum width of the carcass ply 3, and a wire chafer 4' composed of the same steel cords as used in the carcass ply 3 is arranged around the bead ring 2 along the carcass ply and extended upwardly to a height $l_0$ of 94 mm in such a manner that cords of the chafer are inclined at an angle of 60° with respect to the cords of the carcass ply 3, and a metal chafer 4 composed of the reinforcing element $\beta$ using the helically formed filament(s) 6 according to the invention is extended along the outer surface of the wire chafer upwardly from a bead heel to a height l of 150 mm.

FIG. 8b is a modified embodiment of FIG. 8a, wherein a metal flipper 4 composed of the reinforcing element $\beta$ using the helically formed filament(s) according to the invention is extended downwardly from a height l of 370 mm and folded around the bead ring 2 from the inside to the outside thereof and further extended upwardly to a height (l-h$_1$) of 200 mm between the carcass ply 3 and the turn-up portion 3' thereof instead of the protection ply 15, and a conventional nylon chafer 5 (height l$_1$: 150 mm) is used instead of the metal chafer 4 shown in FIG. 8a.

In FIGS. 8a and 8b, each of the metal chafer 4 and the metal flipper 4 is formed by embedding the reinforcing elements β each having a modulus of elasticity of 0.9×10$^4$ kg/mm$^2$ in a rubber having 100% modulus of elasticity of 65 kg/cm$^2$ at ends of 26 elements/5 cm. The reinforcing element β is formed by merely assembling 18 helically formed filaments 6 having filament diameter φ of 0.25 mm and average diameter D of an outer contour projected on a plane perpendicular to the axial direction of one pitch of the filament of 4φ without twisting at random. The reinforcing element β is inclined at an angle of 60° with respect to cords of the carcass ply.

The tires shown in FIGS. 8a and 8b can advantageously reduce separation failure at the cord end of the chipper without deteriorating the rim chafing resistance under severe use conditions.

In FIGS. 9a and 9b are shown the pneumatic radial tires for passenger cars according to the invention, wherein the reinforcing element β composed of helically formed steel filament(s) according to the invention is used as a chafer in FIG. 9a and as a flipper in FIG. 9b.

In the embodiment of FIG. 9a, a carcass ply 3 composed of cords of polyester with 1,500 d/2 is arranged in a radial plane of the tire and extended upwardly around a bead ring 2 to a height h$_0$ of 22 mm and the metal chipper 4 is arranged as a chafer along the turn-up portion 3' of the carcass ply downwardly from a height l of 32 mm to a bead heel. In the embodiment of FIG. 9b, the carcass ply 3 as mentioned above is extended upwardly to a height h$_0$ of 20 mm and the metal chipper 4 is disposed as a flipper between the carcass ply 3 and the turn-up portion 3' thereof along the carcass ply 3 in such a manner that one end of the chipper is located at a height l of 40 mm and the other end thereof is located at a height (l-h$_1$) of 35 mm.

In the former case, the metal chipper 4 is formed by embedding reinforcing elements β each having a modulus of elasticity of 0.23×10$^4$ in rubber at ends of 19 elements/5 cm. The reinforcing element β is formed by merely assembling 5 helically formed filaments having filament diameter φ of 0.25 mm and average diameter D of an outer contour projected on a plane perpendicular to the axial direction of one pitch of the filament of 4φ without twisting at random and inclined at an angle of 65° with respect to cords of the turn-up portion 3' of the carcass ply 3. In the latter case, the metal chipper 4 is formed by embedding the reinforcing elements β each having a modulus of elasticity of 0.18×10$^4$ kg/mm$^2$ in rubber at ends of 19 elements/5 cm. The reinforcing element β is formed by merely assembling 4 helically formed filaments having filament diameter φ of 0.22 mm and average diameter D of an outer contour projected on a plane perpendicular to the axial direction of one pitch of the filament of 4φ without twisting at random and inclined at an angle of 55° with respect to cords of the carcass ply 3. These tires shown in FIGS. 9a and 9b can achieve the effect aimed at the invention.

As mentioned above, the pneumatic radial tire having a bead portion reinforcing construction, wherein a reinforcing element composed of helically formed metal filament(s) according to the invention is used as a chipper, considerably improves the durability of the bead portion and does not accompany the deterioration of rim chafing resistance as compared with the conventional tires of such type.

What is claimed is:

1. A pneumatic radial tire having an improved bead portion reinforcing construction comprising; a carcass body having substantially radially arranged ply cords; a belt for reinforcing a crown portion of said carcass body; and a bead portion reinforcing band disposed along a bead portion formed by folding the ply of said carcass body around a bead ring;said bead portion reinforcing band comprising at least one chipper layer; said chipper comprising an extensible reinforcing element embedded in rubber and formed of from 2 to 30 helically formed metal filaments without twisting; said reinforcing element having a modulus of elasticity of 0.029×10$^4$ kg/mm$^2$ to 1.60×10$^4$ kg/mm$^2$ and a compression modulus of elasticity of 20 to 300 kg/mm$^2$; each of said filaments having a diameter within the range of 0.1 to 1.0 mm; the ratio of maximum diameter to minimum diameter of said filaments in an outer contour projected on a plane perpendicular to the axial direction of one pitch of the filaments being within the range of 1 to 1.5; the ratio of an average diameter of an outer contour of each of said filaments projected on a plane perpendicular to the axial direction of one pitch of the filament to the filament diameter is within a range of 2 to 20; the rubber of said chipper having a 100% modulus of elasticity of 20 to 90 kg/cm$^2$;and said reinforcing element being embedded in said rubber at ends of 10 to 50 elements5 cm and inclined with respect to the ply cords of said carcass body to make said chipper as a whole extensible but otherwise rigid.

* * * * *